United States Patent

[11] 3,601,576

| [72] | Inventors | Hans Schlafli<br>Buren an der Aare;<br>Gottfried Gugger, Steffisburg, both of,<br>Switzerland |
|---|---|---|
| [21] | Appl. No. | 759,659 |
| [22] | Filed | Sept. 13, 1968 |
| [45] | Patented | Aug. 24, 1971 |
| [73] | Assignee | Laser Technique S A<br>Berne, Switzerland |
| [32] | Priority | Sept. 25, 1967 |
| [33] | | Switzerland |
| [31] | | 13,356 |

[54] METHOD FOR BORING WORKPIECES BY LASER PULSES
22 Claims, 4 Drawing Figs.

[52] U.S. Cl.................................................... 219/121 L
[51] Int. Cl..................................................... B23k 9/00
[50] Field of Search............................................ 219/121,
68, 121 EB, 121 L; 356/170; 331/94.5

[56] References Cited
UNITED STATES PATENTS

| 3,265,855 | 8/1966 | Norton | 219/121 |
| 3,308,263 | 3/1966 | Schleich | 219/121 |
| 3,410,979 | 11/1968 | Larsson | 219/121 |
| 3,454,899 | 7/1969 | Lefever | 331/94.5 |

FOREIGN PATENTS

| 684,435 | 12/1952 | Great Britain | 219/121 EB |

OTHER REFERENCES
"Wire & Wire Products" p.p. 1354-7 & 1399-1401 Sept. 1966

Primary Examiner—J. V. Truhe
Assistant Examiner—R. S. Skudy
Attorney—Imirie & Smiley ABSTRACT: A method for boring workpieces of hard material by laser pulses for obtaining the bore sizes within relatively critical tolerances. Laser pulses are used of 0.1 to 0.8 Joule, the duration not exceeding 100 μsec. and the wavelength of the pulses is arranged to exceed 1 μ.

INVENTORS
HANS SCHLAFLI
GOTTFRIED GUGGER

METHOD FOR BORING WORKPIECES BY LASER PULSES

This invention relates to a method for boring workpieces, particularly watch jewels, by means of laser energy, wherein the workpiece is located in or near the laser focus and the laser is released.

Various methods have been suggested in the past for boring workpieces, particularly watch jewels or jewels for other applications, by means of laser energy. Extensive experiments with a wide variety of laser equipment have shown that it is extremely difficult to bore series of watch jewels with the desired quality by means of usual laser equipments. Although it is generally possible to obtain sporadic bores of the desired dimensions and quality it was impossible to reproduce such dimensions and quality with the required reliability. Further it was found that a high percentage particularly of watch jewels is split during boring, this being another reason why an inacceptably high percentage of waste was produced.

Experiments with various solid state lasers, pulse energies and pulse durations have now shown that for reliable boring particularly of watch jewels relatively narrowly limited conditions should be respected when it is desired to produce proper bores without damaging the jewels. The method according to this invention is the result of these experiments, this method being broadly characterized by the use of a pulse energy in the order of 0.1 to 0.8 Joule, a pulse duration not exceeding 100 $\mu$sec. and a wave length of the light exceeding 1 $\mu$.

Preferably a pulse energy of 0.2 to 0.5 Joule and a wave length of 1.06 $\mu$ are used, the pulses being produced by means of a crystal rod containing yttrium, particularly a rod made of yttrium-aluminium garnet (YAG). We have made the surprising experience that it was impossible to obtain proper reproducible bores without damaging of rubin jewels by means of the usual rubin laser rods, this experience resulting in the general rule that a material should be used for the laser crystal which is not similar or identical with the material of the workpiece, particularly watch jewel to be bored.

Preferably the bore, particularly the bore in watch jewels is not bored by one single laser pulse of the above energy and duration but by means of a number of pulses of which the focus is shifted relatively to the boring direction in longitudinal and/or transversal direction. The bores to be produced are not always of the same diameter and it has proved to be particularly advantageous for boring bigger bores to work the bores with a number of six to eight pulses of which the foci are shifted along a circular path round the axis of the bore to be produced. Due to the relatively low-energy per pulse and the high efficiency of the YAG-rods a commercially interesting lifetime of the flash tube of the laser system is obtained.

The invention will now be explained in detail and by way of example with reference to one form of the boring method.

The laser head used for boring is of a structure generally known in the laser technique. A crystal rod of yttrium-aluminium-garnet (YAG) having a length of 65 mm. and a diameter of 6.0 mm. is used, this rod being excited by a flash tube of the type FX-42/A-3 Egerton, Germeshausen and Grier. The power supply unit has a charging capacitor of 125 $\mu$f. and may be charged to a voltage of 1200 V. The maximum output energy produced by this equipment is in the order of 0.8 Joule per pulse. The focusing system of the laser head has a focal length of 25 mm., and it was found that this is favorable for the particular purpose. Similar or even better bores may be produced with focal lengths of less than 25 mm., but with smaller focal length the focusing system is so near to the workpiece to be bored that material ejected from the workpiece may damage the focusing system.

The object to be bored, for instance a watch jewel is now placed in or near the focus of the laser system. For boring watch jewels the power supply unit is so adjusted that the output energy per pulse has a value in the order of 0.2 to 0.5 Joule. Values within this range have been found to be most favorable The laser pulses have a duration 85 $\mu$ sec. and a wave length of 1.06 $\mu$. As set out above, similar reproducible bores of relatively small diameter may be produced under these conditions, whereby damaging of jewels by splitting does not occur. For producing bores of larger diameter the simplest method is to fix the object to be bored, for instance a watch jewel in a rotatable support of which the axis is slightly spaced from the optical axis of the laser system. The jewel is rotated during working of the bore and by means of a suitable cam switch or the like laser pulses are released at regular time intervals. Thereby the bore is produced by a number of pulses acting on places of the jewel regularly and symmetrically distributed round the axis of the bore to be produced. It was found that in this way bores of proper form may be produced with good reproducibility by means of about 6 to 8 pulses of relatively low energy, for instance 0.2 Joule.

With the conditions described above proper results are obtained under normal circumstances, that is at room temperature and in the normal atmosphere. However, further measures may be taken with certain materials or under particular circumstances in order to improve the results. As an example it is possible particularly when bores of substantial axial length are to be produced to apply a number of pulses and to gradually shift the focus of succeeding pulses in the direction of the progress of the bore. It is further possible to apply succeeding pulses of different energy. Since release of a succession of high-energy pulses at short time intervals would require particular performances of the energy supply unit for the flash tube, it is preferable to release a first relatively weak pulse and a number of following pulses of somewhat higher energy. The experiments have shown that bores of practically ideal circular form are obtained with the above method wherein the focus of succeeding pulses is shifted along a circular path, when the first pulse or some of the pulses applied first is or are weaker than the following pulse.

Under circumstances it may be an advantage to heat the workpiece prior to acting onto the same with the laser beam. This measure may be proper when a brittle material tends to split or crack due to thermal stresses occuring during the boring action. Preheating of the workpiece reduces such thermal stresses and prevents damage of the same.

Under particular circumstances it may also be proper to bore workpieces under vacuum, whereby removal of molten, evaporated or burnt material may be assisted and improved.

On the other hand, it may be preferable or required to bore the workpiece in a special atmosphere, for instance in oxygen or in an inert gas.

Experiments have shown that the boring methods described above are applicable for all technically important materials difficult to machine, for instance hard metal, diamond and other jewels.

As explained above, the quality of a bore to be produced by means of laser pulses in a workpiece, particularly in a watch jewel, may be improved by treatment in a particular atmosphere, for instance oxygen. We have now found that further substantial improvement is possible by conducting a proper gas or gaseous medium through the bore during boring. This medium may be air, a gas or gas mixture or even a vapor or mixture of vapor and or other mediums.

This measure is particularly efficient when the gas or other medium is conducted through the bore under relatively high pressure and with high velocity. It is difficult to determine what kind of influence of the gaseous medium is most important for the improvement observed. It may be a chemical action due to the improved exchange of gas, a physical action due to rapid cooling immediately after the action of the laser pulse or purely mechanical action by assisting removal of residues of solidifying molten material or condensating vapors. In fact the experiments clearly prove that by passing a suitable gaseous medium through the bore during boring better form of the bore with regard to cross section and shape of the bore ends is obtained than without setting up a stream of gaseous medium. Particularly a closer approximation of bores to the ideal cylindrical form is possible. This method may preferably be applied in combination with the above method of producing bores by means of a number of succeeding laser pulses.

The invention will now further be explained with reference to a few examples schematically illustrated in the drawing.

FIG. 1 shows the lens 1 of the laser focusing system, a chuck 2 with a watch jewel 3 clamped therein and a nozzle 4 for producing a flat sharp airstream transversely to the axis of the laser focusing system. Pressure air may be admitted from a pressure air source through conduits in the carrier of the chuck 2 (not shown) and through the bore of chuck 2 to the rear side of the jewel 3. During the boring operation by laser energy which may preferably be applied in a number of pulses, pressure air is continuously admitted through the bore of the chuck and through the nozzle 4. An intensive continuous transverse airstream is thus set up above the jewel that is between the same and the lens 1 the focal length of which is in the order of 25 mm. All particles removed from the jewel and ejected from the bore by laser pulses are carried off to the side by said airstream whereby contamination of the lense is prevented. As soon as a bore passing through the jewel has been bored air starts to flow from the chuck through the bore whereby the actions and improvements as explained above are obtained. Residues ejected from the bore by the axial airstream are removed by the transverse stream produced by nozzle 4 and will not arrive at the lens 1 or a protecting pane which may be disposed in front of the lense.

FIG. 2 shows an arrangement wherein the gaseous medium is not admitted from the rear side but from the outside of the jewel 3. A frustoconical casing 5 is located outside the jewel 3 closed at its upper end by means of a window 6 and having an inlet pipe 7 for pressure air. The rim of the opening at the bottom of the casing 5 tightly matches the outside of the jewel so that a substantial portion of the pressure air admitted into the casing through pipe 7 will flow through the bore of the jewel as soon as the same is bored. Substantially the same operation and effects are obtained as explained above with the only difference that a single airstream simultaneously serves for scavenging the bore and for preventing particles from flying towards the lens 1 or the window 6 respectively.

Figure 1:
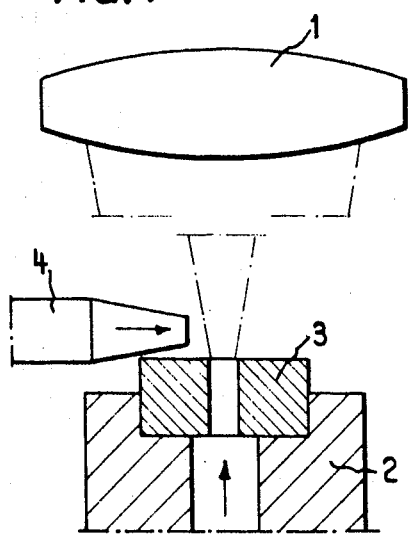
Figure 2:
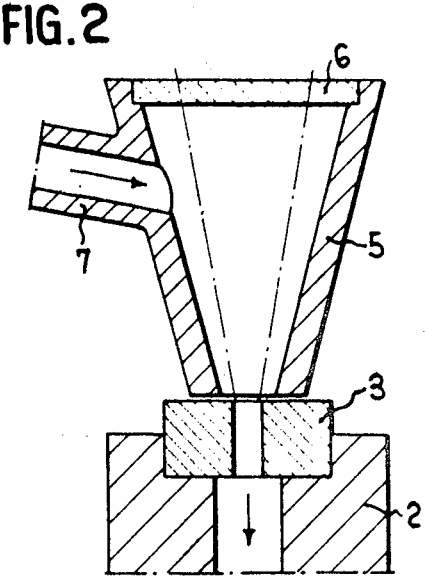
Figure 3:
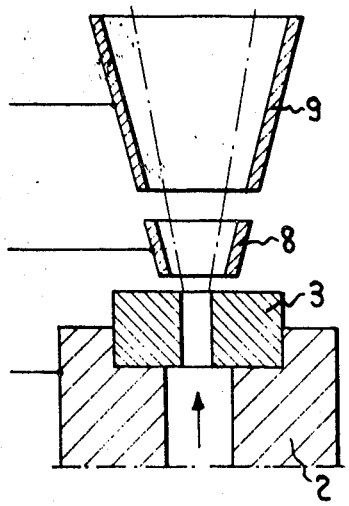
FIG. 3 illustrates an assembly similar to the one shown in FIG. 1, but instead of screening the lens from the boring place by means of a gas curtain an electrostatic precipitation of particles ejected from the bore by means of frustoconical electrodes 8 and 9 is provided.
Figure 4:
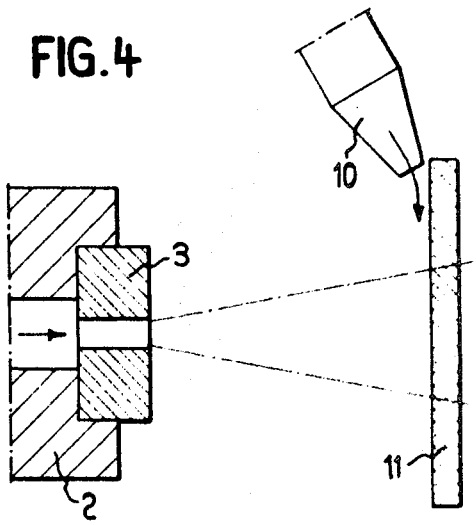
FIG. 4 illustrates a horizontal disposition of the system, wherein the gaseous scavenging medium is admitted from the rear side of the jewel 3. In this embodiment a liquid curtain is used produced by liquid flowing from a nozzle 10 against the downwards along a protecting pane located in front of the lens not shown in FIG. 4.

In the foregoing it was admitted that air is used as a gaseous scavenging and protecting medium, but other mediums may be used having desirable chemical or physical properties in view of the material to be bored. According to the material to be bored it may be desired to use an oxidizing or reducing medium or a substantially neutral atmosphere, whereby suitable gases such as oxygen, hydrogen or nitrogen may be used. Any workpieces of any materials other than jewels used for watch bearings and of any desired form and for any purpose may be bored by the methods described above.

The gaseous medium passed through the bore may contain any desired addition such as fine abrasive particles for improvement of the mechanical scavenging and cleaning effect.

Instead of continuously conducting the scavenging medium through the bore at a constant velocity, it may be admitted pulsewise or alternatively in opposite directions. Its effect may be improved by producing pressure waves in the medium of audible or ultrasonic frequencies. In the embodiments as illustrated and described it is always admitted that the gaseous medium is admitted under pressure. However, it may be advantageous to suck the medium through the bore, for instance by producing underpressure in the bore of chuck 2, whereby air or the gas of any other atmosphere is sucked through the bore of the workpiece into the chuck.

What we claim is:

1. A method for boring workpieces, particularly watch jewels by means of laser energy, comprising providing a laser source adapted for producing pulses of laser energy, and having means focusing said laser energy in a focus, placing said workpiece with the place to be bored in said focus whereafter the laser is released with a pulse energy of 0.1 to 0.8 Joule, a pulse duration not exceeding 100 sec. and the wavelength of the laser energy exceeding 1 $\mu$.

2. A method according to claim 1, wherein laser pulses having an energy of 0.2 to 0.5 Joule are used.

3. A method according to claim 1, wherein laser pulses at a wave length of 1.06 $\mu$ are produced by means of a crystal rod containing yttrium.

4. A method according to claim 3, wherein a crystal rod of yttrium-aluminium-garnet (YAG) is used.

5. A method according to claim 4, wherein a crystal rod having a length of 65 mm. and a diameter of 6.00 mm. is used.

6. A method according to claim 5, wherein an optical system having a focal length not exceeding 25 mm. is used.

7. A method according to claim 1, wherein laser pulses with a duration of at least approximately 85 $\mu$ sec. are used.

8. A method according to claim 1, wherein the bore is made by a succession of several laser pulses, the focus being shifted along a circular path around the axis of the bore to be bored.

9. A method according to claim 1, wherein the bore is made by a succession of several laser pulses, succeeding laser pulses of different energy being released.

10. A method according to claim 1, wherein the workpiece is heated.

11. A method according to claim 1, wherein the workpiece is bored under vacuum.

12. A method according to claim 1, wherein the workpiece is bored in a gas atmosphere, for instance in oxygen.

13. A method for boring workpieces, particularly watch jewels by means of laser energy, comprising providing a laser source adapted for producing pulses of laser energy and having means focusing said laser energy in a focus, placing said workpiece with the place to be bored in said focus and releasing the laser with a pulse energy of 0.1 to 0.8 Joule, a pulse duration not exceeding 100 $\mu$sec. and the wavelength of the laser energy exceeding 1 $\mu$, a gaseous medium being conducted through the bore during boring of the same.

14. A method according to claim 13, wherein a gas such as air, oxygen, nitrogen hydrogen is blown or sucked through the bore.

15. A method according to claim 13, wherein the gas is conducted through the bore during boring of the same in the direction of entrance of the laser or in a direction opposite to the entrance of the laser or alternatively in each of these directions.

16. A method according to claim 13, wherein a fluid flow is set up between the workpiece and the laser-focusing system for carrying away particles removed from the workpiece.

17. A method according to claim 16, wherein said fluid flow is set up in a direction transversely to the direction of entrance of the laser.

18. A method according to claim 17, wherein a film of a liquid is conducted over a protecting pane located between the workpiece and the laser focusing system.

19. A method according to claim 17, wherein a gas flow is set up through the bore from a chamber located between the laser focusing system and the workpiece.

20. A method according to claim 13, wherein removed particles are deposited electrostatically.

21. A method for boring watch jewels by means of laser energy, comprising providing a laser source adapted for producing pulses of laser energy and having means focusing said laser energy in a focus, placing said watch jewel with its central portion to be bored in said focus, and releasing the laser with a pulse energy of 0.1 to 0.8 Joule, a pulse duration not exceeding 100 μsec. and the wave length of the laser energy exceeding 1 μ.

22. A method for boring workpieces of hard and brittle material by means of laser energy, comprising providing a laser source adapted for producing pulses of laser energy and having means focusing said laser energy in a focus, placing the workpiece in the focus and releasing the laser with a pulse energy of 0.1 to 0.8 Joule, a pulse duration not exceeding 100 μsec. and the wavelength of the laser energy exceeding 1 μ.

UNITED STATES PATENT OFFICE
CERTIFICATE OF CORRECTION

Patent No. 3,601,576    Dated August 24, 1971

Inventor(s) Hans Schlafli and Gottfried Gugger

It is certified that error appears in the above-identified patent and that said Letters Patent are hereby corrected as shown below:

In the Heading, after "Priority" add -- and Feb. 14, 1968, Switzerland 2191 --

Claim 1, line 7, (Column 4, line 10) change "100 sec." to -- 100 $\mu$sec. --.

Signed and sealed this 18th day of December 1973.

(SEAL)
Attest:

EDWARD M. FLETCHER, JR.
Attesting Officer

RENE D. TEGTMEYER
Acting Commissioner of Patents